US011739475B2

(12) United States Patent
Prissok et al.

(10) Patent No.: US 11,739,475 B2
(45) Date of Patent: Aug. 29, 2023

(54) WATER VAPOR-PERMEABLE COMPOSITE MATERIAL

(71) Applicant: BASF SE, Ludwigshafen am Rhein (DE)

(72) Inventors: Frank Prissok, Lemfoerde (DE); Juergen Ahlers, Gross-Rohrheim (DE); Amir Doroodian, Lemfoerde (DE); Michael Harms, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/753,295

(22) PCT Filed: Aug. 28, 2020

(86) PCT No.: PCT/EP2020/074045
§ 371 (c)(1),
(2) Date: Feb. 25, 2022

(87) PCT Pub. No.: WO2021/038021
PCT Pub. Date: Mar. 4, 2021

(65) Prior Publication Data
US 2022/0349119 A1    Nov. 3, 2022

(30) Foreign Application Priority Data
Aug. 30, 2019   (EP) .................... 19194556

(51) Int. Cl.
*D06N 3/00* (2006.01)
*D06N 3/14* (2006.01)
*B32B 38/00* (2006.01)
*B32B 38/16* (2006.01)

(52) U.S. Cl.
CPC ......... *D06N 3/0095* (2013.01); *B32B 38/164* (2013.01); *D06N 3/0011* (2013.01); *D06N 3/0027* (2013.01); *D06N 3/14* (2013.01); *B32B 2038/168* (2013.01); *B32B 2305/026* (2013.01); *B32B 2305/20* (2013.01); *B32B 2309/02* (2013.01); *B32B 2309/105* (2013.01); *B32B 2375/00* (2013.01); *D06N 2201/0281* (2013.01); *D06N 2205/16* (2013.01); *D06N 2209/123* (2013.01); *D06N 2211/10* (2013.01); *D06N 2211/106* (2013.01); *D06N 2213/02* (2013.01); *D10B 2401/10* (2013.01); *D10B 2501/04* (2013.01)

(58) Field of Classification Search
CPC .. D06N 3/0095; D06N 3/0011; D06N 3/0027; D06N 3/14; D06N 2201/0281; D06N 2205/16; D06N 2209/123; D06N 2211/10; D06N 2211/106; D06N 2213/02; B32B 38/164; B32B 2038/168; B32B 2305/026; B32B 2305/20; B32B 2309/02; B32B 2309/105; B32B 2375/00; B32B 5/022; B32B 3/266; B32B 5/028; B32B 27/12; B32B 27/40; B32B 33/00; B32B 2262/0292; B32B 2307/724; D10B 2401/10; D10B 2501/04; B01D 67/0009; B01D 69/122; B01D 71/54; B01D 69/12; C08J 5/18; C08J 2375/04
See application file for complete search history.

(56) References Cited

U.S. PATENT DOCUMENTS

| | | | |
|---|---|---|---|
| 2010/0028553 A1 | 2/2010 | Maly et al. | |
| 2010/0041295 A1 | 2/2010 | Malz et al. | |
| 2010/0323573 A1* | 12/2010 | Chu | B01D 65/08 977/773 |
| 2011/0092122 A1* | 4/2011 | Conley | B32B 27/02 977/961 |
| 2014/0332459 A1 | 11/2014 | Hu | |
| 2015/0053345 A1* | 2/2015 | Schroer | B29C 66/72941 156/308.6 |

FOREIGN PATENT DOCUMENTS

| | | | |
|---|---|---|---|
| CN | 108929457 A | * 12/2018 | ................ C08J 9/26 |
| EP | 2077733 | 4/2011 | |
| EP | 3722476 | 10/2020 | |
| KR | 20170120807 | 11/2017 | |

(Continued)

OTHER PUBLICATIONS

Kunststoffhandbuch [Plastics Handbook], 7, Polyurethane [Polyurethanes], Carl Hanser Verlag, 3rd edition, section 3.1,1993, 20 pages.
International Search Report dated Nov. 13, 2020 in PCT/EP2020/074045, with English translation, 7 pages.
KunststoffHandbuch, 7, "Polyurethane", Carl Hanser Verlag, 1st edition, 1966, pp. 103-113.
Written Opinion dated Nov. 13, 2020 in PCT/EP2020/074045, with English Translation, 18 pages.

(Continued)

*Primary Examiner* — Christopher W Raimund
(74) *Attorney, Agent, or Firm* — Grüneberg and Myers PLLC

(57) ABSTRACT

A composite material contains a nonwoven layer (i) which contains fibers formed from a first thermoplastic elastomer having meshes with a mesh size in the range from 10 to 100 μm, and a membrane layer (ii) which contains a second thermoplastic elastomer and having a layer thickness of less than 30 μm. The membrane is either pore-free (ii.1) or is porous and has pores with an average pore diameter of less than 2000 nm (ii.2). The membrane (ii) is at least partially in direct contact with the fibers of the nonwoven layer (i) and covers the mesh openings in the nonwoven layer (i) at least partially. The fibers of the first nonwoven layer (i) and the membrane (ii) in the contact area are at least partly joined to one another in an interlocking manner.

14 Claims, No Drawings

(56) References Cited

FOREIGN PATENT DOCUMENTS

| KR | 20170120818 | 11/2017 | | |
|----|----|----|----|----|
| KR | 20170120821 | 11/2017 | | |
| WO | 2008/087087 | 7/2008 | | |
| WO | WO-2011091337 A1 * | 7/2011 | ........... | D01D 5/0985 |
| WO | 2012/111930 | 8/2012 | | |
| WO | WO-2017178482 A1 * | 10/2017 | ......... | B01D 67/0009 |
| WO | 2019/072754 | 4/2019 | | |

OTHER PUBLICATIONS

International Preliminary Report on Patentability dated Nov. 4, 2021 in PCT/EP2020/074045.

Translation of the International Preliminary Report on Patentability, 6 pages, (Original International Preliminary Report was previously submitted).

* cited by examiner

WATER VAPOR-PERMEABLE COMPOSITE MATERIAL

CROSS-REFERENCE TO RELATED APPLICATIONS

This application is a National Stage entry under § 371 of International Application No. PCT/EP2020/074045, filed on Aug. 28, 2020, and which claims the benefit of priority to European Application No. 19194556.7, filed on Aug. 30, 2019. The content of each of these applications is hereby incorporated by reference in its entirety.

BACKGROUND OF THE INVENTION

Field of the Invention

The present invention relates to a composite material comprising a nonwoven layer (i) comprising fibers formed from a first thermoplastic elastomer having meshes with a mesh size in the range from 10 to 100 µm; and a membrane layer (ii) comprising a second thermoplastic elastomer and having a layer thickness of less than 30 µm, wherein the membrane is either pore-free (ii.1) or is porous and has pores with an average pore diameter of less than 2000 nm, determined by means of Hg porosimetry in accordance with DIN 66133, (ii.2); wherein the membrane (ii) is at least partially in direct contact with the fibers of the nonwoven layer (i), and covers the mesh openings in the nonwoven layer (i) at least partially, and wherein the fibers of the first nonwoven layer (i) and the membrane (ii) in the contact area are at least partly joined to one another in an interlocking manner.

The invention further relates to a process for producing such a composite material and to a composite material obtained or obtainable by this process. The invention also relates to the use of such a composite material for the production of a functional article.

Description of Related Art

Functional articles, in particular functional clothing for various areas of application, are known in various designs, with coated fabrics or film or membrane laminates often being used. Functional articles are usually required to have sufficient stability or durability while simultaneously having satisfactory elongation at break and water resistance with respect to liquids impinging from the outside, but with the desired breathability/water vapor permeability at the same time. In the case of membrane laminates, which generally consist of a carrier layer, the membrane and a hardwearing outer layer, these are generally produced by sewing together laminate segments and adhesively bonding a waterproof tape over the seam. In this case, however, the seam stitches in turn lead to possible entry points for water, which is why the seam then usually also has to be sealed with an overlying adhesive or a sealing tape. Normal (hot) welding of individual layers is often not possible since in the process the micro/nanostructures of the individual layers are destroyed such that the desired properties—in particular the gas permeability—in the welded composite are no longer achieved or the layers simply cannot be welded together since they are not thermoplastic at the welding temperature used or do not create any cohesive composite as a result of the welding. In accordance with DIN ISO 857-1 (formerly DIN 1910-1), welding is understood to mean the non-detachable joining of components using heat or pressure (with or without welding fillers). Depending on the welding process, the joining is effected in a weld seam or a weld spot. The energy required for the welding is always supplied from the outside. EP 2 077 733 A1 describes a multilayer item of clothing which allows moisture vapors to pass through and in which a layer of nanofibers is embedded between two woven plies or plies formed from knitted fabric. As can be seen from the examples, a nylon nonwoven is embedded between two plies of polyester nonwoven (knitted fabric), with a solvent-based urethane adhesive being used for the joining—cold welding or cohesive joining by welding such layers would not be possible on account of the incompatible materials. US 2010/0028553 A1 discloses a process for producing a nanofiber layer which is applied to a substrate. Hydrophobic polypropylene nonwovens are the substrate in this case—no information is given regarding the polymeric material of the applied nanofibers. An electrospinning device is also described in WO 2012/111930 A2.

KR 2017120821 A deals with the subject of producing a polymer nonwoven by means of electrospinning on a release paper, applying it to a first polyurethane base material and then joining it to the latter and to a further polyurethane base material by the action of heat. Similarly, in KR 2017120807 A, a polymer nonwoven is respectively applied to both sides of a polyurethane base material. Neither of these documents provides any information on the nature of the polyurethane base material and various polymers are described for the nonwoven layer. Comparably, in KR 2017120818 A, two polymer nonwovens are produced in each case by electrospinning on release paper and are then joined to a polyurethane base material by the action of heat. Subsequent welding of individual layers, as in the abovementioned Korean documents, results in the micro-/nanostructures of the individual layers being destroyed such that the desired properties—for example the gas permeability—in the welded composite are no longer achieved.

In summary, it can be said that composite materials in which a nonwoven fabric is intended to be joined to a layer of a differently formed material are difficult or impossible to produce using conventional methods such as sewing, adhesive bonding or subsequent (hot) welding. Even if joining the layers is successful, the properties obtained are unsuitable for further use in a functional article.

Conventional nonwovens in which the fibers have a diameter in the range from 1 to 50 µm and the nonwoven has a mesh size in the range from 10 to 100 µm do not have sufficient watertightness on their own, but are of interest as an underlayer for composite materials. In the case of nonwovens, a loose fibrous web is present which is solidified for example by heat and is held together solely as a result of an interlocking fit and/or cohesion and/or adhesion. This distinguishes nonwovens from woven fabrics and knitted fabrics. In the case of woven fabrics, the surfaces are produced by crossing two thread systems; in the case of knitted fabrics, loops formed by means of threads are looped into other loops. The use of woven fabrics, but also of knitted fabrics, as a substrate usually results in the composite systems obtained being too rigid or exhibiting insufficient elongation at break. Furthermore, production via "knitting" is significantly more expensive and the mesh size is coarser since work must be performed using a type of needle, and in addition a lubricant is required when "knitting" so that the threads glide over the needles. Films are not usually suitable as substrates since they often do not permit sufficient water vapor permeability.

A process in which electrospinning is used to apply a nonwoven layer to another nonwoven layer, and a nonwoven composite material obtained, are described in the as-yet unpublished application EP 19168078.4 (filing date Apr. 9, 2019).

SUMMARY OF THE INVENTION

The object of the present invention was to provide a composite material based on a nonwoven layer, which overcomes the abovementioned disadvantages and in particular offers sufficient watertightness (LEP) and water vapor permeability (WVP).

The object was achieved by a composite material comprising
i) a nonwoven layer comprising fibers formed from a first thermoplastic elastomer having meshes with a mesh size in the range from 10 to 100 µm:
ii) a membrane layer comprising a second thermoplastic elastomer and having a layer thickness of less than 30 µm, wherein the membrane is either pore-free (ii.1) or is porous and has pores with an average pore diameter of less than 2000 nm, determined by means of Hg porosimetry in accordance with DIN 66133, (ii.2);
wherein the membrane (ii) is at least partially in direct contact with the fibers of the nonwoven layer (i), and covers the mesh openings in the nonwoven layer (i) at least partially, and wherein the fibers of the first nonwoven layer (i) and the membrane (ii) in the contact area are at least partly joined to one another in an interlocking manner.

DETAILED DESCRIPTION OF THE INVENTION

A "nonwoven" or a "nonwoven layer" means, as already briefly mentioned above in the introduction, a non-woven fabric. A "nonwoven" or a "nonwoven layer" consists entirely or to a substantial extent (>90% by weight) of fibers, with "fibers" encompassing spinning fibers, filaments (continuous fibers) and fibers having a slenderness ratio (ratio of fiber length in mm to fiber diameter in mm) of at least 300. The diameter of the fibers (fiber diameter) of the nonwoven layer (i) is determined by means of scanning electron microscopy (SEM). Ways for joining the fibers together in the nonwoven are interlocking fit (by entangling) and/or cohesion and/or adhesion, the fibers in the nonwoven being arranged in an oriented fashion or randomly. A "mesh" is a fiber loop that is hooked into one or more other fiber loops. The "mesh size" (w) is the clear distance between two adjacent fibers or fiber sections measured in the middle of the mesh. The mesh size is determined by means of scanning electron microscopy. The corresponding opening between the adjacent fibers or fiber sections is referred to as the "mesh opening".

A "membrane layer" is also referred to synonymously here as a membrane for short. A "membrane" means an (ultra)thin layer comprising the second thermoplastic elastomer; synonymous term: film, where "thin" means a layer thickness of less than 50 µm. "Ultrathin" means layer thicknesses of less than 30 µm. "Pore-free" in (ii.1) means that the membrane does not have any continuous opening from the upper side to the underside through which a gas can move freely. "Porous" means that the membrane has continuous openings from the upper side to the underside of the membrane through which a gas can move freely. "Joined to one another in an interlocking manner" means that the polymer chains of the first and of the second thermoplastic elastomer have been or are entangled with one another during the joining or in the contact area between nonwoven layer (i) and membrane layer (ii). The joining is based on (cold) welding, that is to say the swelling and/or partial dissolution of the nonwoven layer (i) and/or of the membrane layer (ii) brought about by the presence of solvents and the subsequent hardening of the membrane layer (ii) on the nonwoven layer (i) upon removal of the solvent. The solvent is preferably removed at a temperature in the range from 23 to <100° C., more preferably in the range from 23 to 99° C., preferably at a pressure in the range from 1 to 1500 mbar, more preferably in the range from 1 to 1013 mbar. The solvent is preferably removed over a period of time of from 10 minutes to 24 hours, more preferably over a period of time of from 1 hour to 10 hours. The "layer thickness" of a membrane or of a membrane layer is in each case determined by means of a micrometer screw gauge or scanning electron microscopy (SEM), and is preferably determined by means of SEM.

In one embodiment, the composite material therefore comprises
i) a nonwoven layer comprising fibers formed from a first thermoplastic elastomer having meshes with a mesh size in the range from 10 to 100 µm;
ii) a membrane layer comprising a second thermoplastic elastomer and having a layer thickness of less than 30 µm, wherein the membrane is either pore-free (ii.1) or is porous and has pores with an average pore diameter of less than 2000 nm, determined by means of Hg porosimetry in accordance with DIN 66133, (ii.2);
wherein the membrane (ii) is at least partially in direct contact with the fibers of the nonwoven layer (i), and covers the mesh openings in the nonwoven layer (i) at least partially, and wherein the fibers of the first nonwoven layer (i) and the membrane (ii) in the contact area are at least partly joined to one another in an interlocking manner, in that the polymer chains of the first and of the second thermoplastic elastomer have been or are entangled with one another during the joining or in the contact area between nonwoven layer (i) and membrane layer (ii), wherein the joining is preferably based on (cold) welding, that is to say that the first nonwoven layer (i) and membrane (ii) are cold-welded together in the composite material.

Surprisingly, it was shown that such a composite material has a sufficient elongation at break (preferably >200%). The water vapor permeability (WVP) at 38° C. and 90% humidity of the composite material is at the same time at least 1000 g/m²*d, determined in accordance with DIN 53122-1 (August 2001); the watertightness (LEP, determined in accordance with DIN EN 20811 (August 1992)) is at least 0.5 bar. The composite material has a good watertightness of at least 0.5 bar, and yet, as a result of the thinness of the membrane layer of less than 30 µm, is capable of adequately transporting moisture through absorption/resorption. In particular, composite materials comprising pores, as a result of the addition of additives during the production of the films and the later removal of these additives, have particularly good values for water vapor permeability while the watertightness is sufficiently high in spite of this. In summary, the composite material can therefore also be referred to synonymously as "water vapor-permeable composite material".

In one embodiment of the composite material, the membrane layer (ii) is obtained or obtainable by
(1) providing a solution (L1) comprising at least one thermoplastic elastomer;
(2) creating a membrane from the solution (L1) by means of phase inversion.

In one embodiment of the composite material, the solution (L1) further comprises at least one additive selected from the group consisting of polytetrahydrofuran (PTHF) and ammonium compound, wherein (2) comprises:
(2.a) forming a film from the solution (L1):
(2.b) heating the film obtained according to (2.a) to a temperature of ≥60° C., preferably in the range from 60 to 130° C., to obtain a porous film having pores with an average pore diameter of less than 2000 nm, determined by means of Hg porosimetry in accordance with DIN 66133,
wherein the ammonium compound preferably comprises one or more ammonium compounds which decompose below the softening temperature of the TPU and leave behind pores without residue, more preferably one or more ammonium compounds selected from the group consisting of ammonium acetate [$NH_4(O-C(=O)-CH_3)$], diammonium carbonate [$(NH_4)_2CO_3$] and ammonium hydrogen carbonate (salt of hartshorn, $NH_4HCO_3$), more preferably at least ammonium acetate.

The PTHF optionally added as additive preferably has a number-average molecular weight in the range from 500 to 5000, preferably in the range from 750 to 2500 g/mol, more preferably in the range from 800 to 1200 g/mol and is particularly preferably PTHF1000. With respect to the formation of pores when adding PTHF as additive, it is assumed, without being bound to this theory, that PTHF is absorbed by the membrane or the nonwoven after formation of the film, preferably in the absence of solvent, and the pores form as a result.

Particular porous membranes are described in WO 2019/072754 A1.

In one embodiment of the composite material, the first thermoplastic elastomer of the nonwoven layer (i) and the second thermoplastic elastomer of the membrane layer (ii) are independently selected from the group consisting of polyurethane, polyester, polyetherester, polyesterester, polyamide, polyetheramide, polybutadiene-styrene, and ethylene-vinyl acetate, the first thermoplastic elastomer and the second thermoplastic elastomer being selected such that they are mutually compatible, wherein the first thermoplastic elastomer and second thermoplastic elastomer are preferably both a, respectively mutually compatible, thermoplastic polyurethane (TPU), where the TPU of the nonwoven layer (i) is identical to or different from, preferably identical to, the TPU of the membrane layer (ii). "Mutually compatible" means that the first and second thermoplastic polymer are compatible in terms of chemical compatibility, with the adhesion of the membrane layer (ii) to the nonwoven layer (i) (synonym: carrier layer) being essential here. The membrane layer (ii), which may possibly still comprise solvent, adheres to the carrier layer due to cold welding, i.e. an interlocking bond between nonwoven layer (i) and membrane layer (ii) is formed, which is possible only with polymers in which the soft phases have identical components to an extent of at least 50% by weight, preferably to an extent of at least 60% by weight, more preferably to an extent of at least 65% by weight. This applies in particular when the thermoplastic polymer has a proportion of the soft phase of at least 50% by weight based on the total weight of the thermoplastic polymer. In a preferred embodiment, in which the first thermoplastic elastomer and the second thermoplastic elastomer are both a, respectively mutually compatible, thermoplastic polyurethane (TPU) (TPU1: TPU of the nonwoven layer (i), TPU2: TPU of the membrane layer (ii)), these are mutually compatible when the soft phases of TPU1 and TPU2 have identical components to an extent of at least 50% by weight, preferably to an extent of at least 70% by weight, more preferably to an extent of at least 80% by weight. This applies in particular when both TPU1 and TPU2 have a proportion of the soft phase of at least 50% by weight based on the total weight of the respective TPU.

Thermoplastic polyurethane (TPU) is known to the person skilled in the art. In one embodiment of the nonwoven composite material, a TPU is based on the following components:
at least one compound (C1) having at least two isocyanate-reactive groups;
at least one isocyanate (I1);
at least one diol (D1).

In a particularly preferred embodiment of the nonwoven composite material, a TPU which is used is based on the following components:
11% to 79% by weight, preferably 15% to 75% by weight, more preferably 20% to 75% by weight, of a mixture of at least one diol (D1) and at least one isocyanate (I1),
21% to 89% by weight, preferably 25% to 85% by weight, more preferably 25% to 80% by weight, of at least one compound (C1) having at least two isocyanate-reactive groups.

In a preferred embodiment, in which the first thermoplastic elastomer and the second thermoplastic elastomer of the nonwoven composite material are both a, respectively mutually compatible, thermoplastic polyurethane (TPU), i.e. the first thermoplastic elastomer is a TPU1 and the second thermoplastic elastomer is a TPU2, both TPU1 and TPU2 are based on the components mentioned, more preferably on the components mentioned in the amounts mentioned.

The molar ratio of the at least one diol (D1) to the at least one isocyanate (I1) is typically in the range from 1:3 to 3:1. Preferably, the molar ratio of the at least one diol (D1) to the at least one isocyanate (I1) is in the range from 1:1 to 1:2, preferably in the range from 1:1.2 to 1:1.8, more preferably in the range from 1:1.4 to 1:1.6.

The at least one compound (C1) can be any compound having at least two isocyanate-reactive groups. The isocyanate-reactive groups are preferably hydroxy or amino groups. The at least one compound (C1) can be added to modify the properties of the TPU. Any compound can be used as long as it is capable of giving a thermoplastic polyurethane with the mixture of the at least one diol (D1) and the at least one isocyanate (I1). For example, the at least one compound (C1) may be a polyol, or alternatively a polymer having at least two hydroxy groups or at least two amino groups other than a polyol, for example a hydrophobic polymer or oligomer comprising silicon. In a preferred embodiment, the at least one compound (C1) having at least two isocyanate-reactive groups is a polyol. Polyols are known to those skilled in the art and described for example in "Kunststoffhandbuch, 7, Polyurethane", Carl Hanser Verlag, 3rd edition 1993, section 3.1. Polyols which are preferably used are polymeric compounds having hydrogen atoms which are reactive toward isocyanates. It is possible here to use all suitable polymers, for example polyether polyols or polyester polyols or mixtures of two or more of these, preferably polyether diols or polyester diols, or mixtures of two or more of these. Suitable polyether diols are, for example, polyether diols based on tetrahydrofuran (THF), ethylene oxide (EO) or propylene oxide (PO) or mixtures thereof, for example copolymers such as block copolymers. In addition, any suitable polyester diol can be used, with polyester diol here also including polycarbonate diols.

The first thermoplastic elastomer and the second thermoplastic elastomer preferably both comprise a TPU based on at least one polyether diol, at least one polyester diol or a mixture of at least one polyether diol and at least one polyester diol as compound (C1), more preferably first thermoplastic elastomer and second thermoplastic elastomer both consist of a TPU based on at least one polyether diol, at least one polyester diol or a mixture of at least one polyether diol and at least one polyester diol as compound (C1). Preferred polyether diols are polymeric compounds of the formula H—[—O—(CH$_2$)]$_n$—OH, where x is an integer in the range from 2 to 10, preferably in the range from 2 to 4; and n is an integer in the range from 5 to 100, preferably in the range from 10 to 40. Particularly preferred polyether diols are polyethylene glycols (PEGs) having number-average molecular weights in the range from 500 to 5000 g/mol, preferably in the range from 1000 to 2000 g/mol, or polytetrahydrofurans (PTHFs) having number-average molecular weights in the range from 500 to 5000 g/mol, preferably in the range from 750 to 2500 g/mol, more preferably in the range from 1000 to 2000 g/mol (PTHF1000-PTHF2000). Preferred polyester diols may for example be prepared from organic dicarboxylic acids having 2 to 12 carbon atoms, preferably aliphatic dicarboxylic acids having 4 to 6 carbon atoms, and diols having 2 to 12 carbon atoms, preferably 2 to 6 carbon atoms, where in one embodiment a polyester diol based on adipic acid and butane-1,4-diol is used. Polyester diols preferably have number-average molecular weights in the range from 500 to 5000 g/mol, preferably in the range from 1000 to 4000 g/mol, more preferably in the range from 2000 to 3000 g/mol. In a preferred variant, the first thermoplastic elastomer and the second thermoplastic elastomer both comprise a TPU based on at least one polyether diol as compound (C1), more preferably first thermoplastic elastomer and second thermoplastic elastomer both consist of a TPU based on at least one polyether diol as compound (C1), the preferences given above applying to the at least one polyether diol.

The at least one isocyanate (I1) is preferably at least one polyisocyanate (I1). Polyisocyanates (I1) that may be used are aliphatic, cycloaliphatic, araliphatic and/or aromatic polyisocyanates, preferably diisocyanates. Examples include the following aromatic diisocyanates: toluene 2,4-diisocyanate, mixtures of toluene 2,4- and 2,6-diisocyanate, diphenylmethane 4,4'-, 2,4'- and/or 2,2'-diisocyanate (MDI), mixtures of diphenylmethane 2,4'- and 4,4'-diisocyanate, urethane-modified liquid diphenylmethane 4,4'- and/or 2,4'-diisocyanate, 4,4'-diisocyanatodiphenylethane, mixtures of monomeric methanediphenyl diisocyanates and other highly polycyclic homologs of methanediphenyl diisocyanate (polymeric MDI), naphthylene 1,2- and 1,5-diisocyanate. Aliphatic diisocyanates are customary aliphatic and/or cycloaliphatic diisocyanates, for example tri-, tetra-, penta-, hexa-, hepta-, and/or octamethylene diisocyanate, 2-methylpentamethylene 1,5-diisocyanate, 2-ethylbutylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, dicyclohexylmethane 4,4'-, 2,4'- and/or 2,2'-diisocyanate (H12MDI). In one embodiment, the at least one isocyanate (I1) is a diisocyanate selected from the group consisting of diphenylmethane diisocyanate (MDI), toluene diisocyanate (TDI), and hexamethylene diisocyanate (HDI), dicyclohexylmethane 4,4'-diisocyanate (H12MDI), and preferably comprises at least MDI.

The polyisocyanate can be used in pure form or in the form of a composition, for example as an isocyanate prepolymer. In addition, a mixture comprising polyisocyanate and at least one solvent can be used, suitable solvents being known to those skilled in the art. Polyisocyanate prepolymers can be obtained by means of reaction of the above-described polyisocyanates in excess, for example at temperatures in the range from 30 to 100° C., preferably at more than 80° C., with polyols to obtain the prepolymer. For the preparation of the prepolymer, preference is given to using polyisocyanates and commercially available polyols based on polyesters, derived for example from adipic acid, or on polyethers, derived for example from tetrahydrofuran, ethylene oxide and/or propylene oxide. Polyols are known to those skilled in the art and described for example in "Kunststoffhandbuch, 7, Polyurethane", Carl Hanser Verlag, 3rd edition 1993, section 3.1. Polyols which are preferably used are polymeric compounds having hydrogen atoms which are reactive toward isocyanates. Particularly preferred polyols are polyether polyols. In the preparation of the polyisocyanate prepolymers, customary chain extenders or crosslinking agents can optionally be added to the polyols. Preferred chain extenders are ethanediol, butanediol, hexanediol and monoethylene glycol, further preferably at least butane-1,4-diol or monoethylene glycol. In this case, the ratio of the organic polyisocyanates to polyols and chain extenders is preferably selected such that the isocyanate prepolymer has an NCO content in the range from 2% to 30% by weight, more preferably in the range from 6% to 28% by weight, more preferably in the range from 10% to 24% by weight.

The diol (D1) used that functions as chain extender (K) may generally be any diol. The diol (D1) is preferably selected from the group consisting of aliphatic, araliphatic, aromatic, and/or cycloaliphatic compounds having a molar mass in the range from 0.05 kg/mol to 0.499 kg/mol, preferably difunctional compounds, for example diamines and/or alkanediols having 2 to 10 carbon atoms in the alkylene moiety, di-, tri-, tetra-, penta-, hexa-, hepta-, octa-, nona-, and/or decaalkylene glycols having from 3 to 8 carbon atoms, especially ethylene 1,2-glycol, propane-1,3-diol, butane-1,4-diol, hexane-1,6-diol, and preferably corresponding oligo- and/or polypropylene glycols such as diethylene glycol, dipropylene glycol, cyclohexane-1,4-diol, cyclohexane-1,4-dimethanol, and neopentyl glycol, and it is thus possible to use mixtures. The diols preferably have solely primary hydroxy groups. In one embodiment, the diol (D1) used is preferably butane-1,4-diol, propane-1,3-diol or mixtures of butane-1,4-diol and propane-1,3-diol.

In the preparation of the TPU, further compounds such as for example catalysts and/or customary auxiliaries and/or additives may be used. Customary auxiliaries are for example surface-active substances, fillers, flame retardants, nucleating agents, oxidation stabilizers, lubricants and mold release aids, dyes, pigments and optionally stabilizers, for example for protection against hydrolysis, light, heat or discoloration, inorganic and/or organic fillers, reinforcers and plasticizers. Customary auxiliaries and additives can be found for example in the "Kunststoffhandbuch" [Plastics Handbook] ("Kunststoffhandbuch"; 7, "Polyurethane" [Polyurethanes], Carl Hanser Verlag, 1st edition, 1966, pages 103-113).

In one embodiment of the composite material, the fibers of the nonwoven layer (i) have a diameter in the range from 0.01 to 100 µm, preferably in the range from 1 to 50 µm, more preferably in the range from 5 to 30 µm, more preferably in the range from 10 to 30 µm. In one embodiment of the composite material, the nonwoven layer (i) has a mesh size in the range from 20 to 95 µm, preferably in the range from 30 to 90 µm, more preferably in the range from 40 to 80 µm.

In one embodiment, the composite material has a watertightness (LEP) of at least 0.5 bar, preferably at least 1 bar. In one embodiment, the composite material has an elongation at break of more than 200%, preferably of more than 250%. In one embodiment, the composite material has a water vapor permeability (WVP) at 38° C. and 90% humidity of at least 1000 g/m$^2$*d. Preferably, the composite material has a watertightness (LEP) of at least 0.5 bar, preferably at least 1 bar, and at the same time has an elongation at break of more than 200%, preferably of more than 250%, and a water vapor permeability (WVP) at 38° C. and 90% humidity of at least 1000 g/m$^2$*d.

Process for Producing a Composite Material

The invention also relates to a process for producing a composite material, comprising:
a) providing a nonwoven layer (i) comprising fibers formed from a first thermoplastic elastomer and having meshes with a mesh size in the range from 10 to 100 µm;
b) providing a membrane layer (ii) comprising a second thermoplastic elastomer which is compatible with the first thermoplastic elastomer of the nonwoven layer (i);
c) applying the membrane layer (ii) to the nonwoven layer (i) and joining (i) and (ii) in an interlocking manner by means of cold welding;
to obtain a composite material.

The membrane layer (ii) is preferably provided in step b) in a state in which it still comprises a sufficient amount of solvent. More preferably, the membrane layer comprises 5-80% by weight, preferably 10-40% by weight, of solvent based on the total weight of membrane layer (ii) and solvent present therein. The membrane layer (ii) is therefore preferably applied to the nonwoven layer (i) in step c) in a state onto the carrier nonwovens in which it still comprises a sufficient amount of solvent or adhesion in order to be cold welded to the carrier nonwoven and to form an interlocking join. The solvent is preferably the organic solvent described in more detail below with respect to the production of the membrane layer (ii).

"Interlocking joining of (i) and (ii) by means of cold welding" according to step c) means that the membrane layer (ii) still comprising solvent adheres to the nonwoven layer (i) as a result of cold welding, i.e. an interlocking bond is formed between nonwoven layer (i) and membrane layer (ii). In this case the fibers of the nonwoven layer (i) and the membrane (ii) in the contact area at least partly form an interlocking join with one another, in that the polymer chains of the first and of the second thermoplastic elastomer are entangled with one another during the joining or in the contact area between nonwoven layer (i) and membrane layer (ii), that is to say that on account of the presence of solvent firstly the nonwoven layer (i) and/or the membrane layer (ii) partly dissolve; and then the membrane layer (ii) hardens on the nonwoven layer (i) when the solvent is removed. Such a cold welding according to step c) is preferably effected at temperatures in the range from 10 to 30° C. and can be effected continuously or discontinuously, unconstrained or in a press apparatus.

In one embodiment of the process for producing a composite material, the first thermoplastic elastomer of the nonwoven layer (i) provided according to (a) and the second thermoplastic elastomer of the membrane layer (ii) provided according to (b) are independently selected from the group consisting of polyurethane, polyester, polyetherester, polyesterester, polyamide, polyetheramide, polybutadiene-styrene, and ethylene-vinyl acetate, the first thermoplastic elastomer and the second thermoplastic elastomer being selected such that they are mutually compatible, wherein the first thermoplastic elastomer and the second thermoplastic elastomer are preferably both a, respectively mutually compatible, thermoplastic polyurethane (TPU), where the first TPU is identical to or different from, preferably identical to, the second TPU.

In one embodiment of the process for producing a composite material, the membrane layer (ii) has a layer thickness of less than 30 µm, wherein the membrane is either pore-free (ii.1) or is porous and has pores with an average pore diameter of less than 2000 nm, determined by means of Hg porosimetry in accordance with DIN 66133, (ii.2).

In one embodiment of the process for producing a composite material, (b) comprises:
b.1) providing a polymer solution comprising the second thermoplastic elastomer, which is compatible with the first thermoplastic elastomer of the nonwoven layer (i);
b.2) creating a membrane layer (ii) from the polymer solution provided according to (b.1) by means of phase inversion.

In one embodiment of the process for producing a composite material, the polymer solution provided according to (b) comprises an organic solvent having a $\log_{KOW}$ in the range from −1.5 to +1, preferably selected from the group of dimethylformamide (DMF, $\log_{KOW}$–0.85), tetrahydrofuran (THF, $\log_{KOW}$ 0.46), dimethyl sulfoxide (DMSO, $\log_{KOW}$–1.35), N-methyl-2-pyrrolidone (NMP, $\log_{KOW}$–0.46), ethyl ester of acetic acid (ethyl acetate, $\log_{KOW}$ 0.73), methyl ethyl ketone (MEK, $\log_{KOW}$ 0.29), ethyl ethyl ketone (EEK, $\log_{KOW}$ 0.99) and mixtures of two or more of these organic solvents, more preferably selected from the group of DMF, THF, and mixtures of DMF and THF. In one embodiment of the process for producing a composite material, the polymer solution provided according to (b) has a polymer concentration in the range from 3-50% by weight, preferably in the range from 5-30% by weight, more preferably in the range from 10-20% by weight, in particular when the second thermoplastic elastomer is a TPU, based in each case on the total weight of the polymer solution of 100% by weight.

In one embodiment of the process for producing a composite material, the polymer solution further comprises at least one additive selected from the group consisting of polytetrahydrofuran and an ammonium compound, and optionally water, wherein (b.2) according to embodiment 12 comprises:
(b.2.a) forming a film from the polymer solution;
(b.2.b) heating the film obtained according to (b.2.a) to a temperature of ≥60° C., preferably to a temperature in the range from ≥60° C. to 130° C., to obtain a porous membrane layer (ii.2) having pores with an average pore diameter of less than 2000 nm, determined by means of Hg porosimetry in accordance with DIN 66133.

In one embodiment of the process for producing a composite material, the polymer solution comprises the at least one further additive in a weight-based mixing ratio of second thermoplastic elastomer:additive of 1:10 to 10:1, preferably 1:5 to 5:1.

In one embodiment of the process for producing a composite material, the fibers of the nonwoven layer (i) provided according to (a) have a diameter in the range from 0.01 to 100 µm, preferably in the range from 1 to 50 µm, more preferably in the range from 5 to 30 µm, more preferably in the range from 10 to 30 µm.

In one embodiment of the process for producing a composite material, the nonwoven layer (i) provided according to (a) has a mesh size in the range from 20 to 95 µm, preferably in the range from 30 to 90 µm, more preferably in the range from 40 to 80 µm.

The invention further relates to a composite material obtained or obtainable by the process described above.

The invention also relates to the use of a composite material as described above or of a nonwoven composite material obtained or obtainable by the process described above for the production of a functional article, the functional article preferably being selected from the group consisting of an item of functional clothing, in particular jacket, trousers, sweater, vest, hooded shirt, overalls, cape, poncho, coat, cap or hat, preferably for sportswear such as golf, ski, hiking, running, and jogging wear, functional shoe, a functional item, in particular bag, rucksack or tent; an item of swimwear, in particular swimsuit, tankini, bikini, swimming trunks, bathing shoe or bathing cap; clothing for water sports, in particular sailing wear, surf wear or kitesurf wear, preferably surf wear or kitesurf wear, preferably an item of functional clothing.

The present invention is illustrated further by the following embodiments and combinations of embodiments as indicated by the corresponding references and back-references. In particular, it should be emphasized that in every instance where a range of embodiments is given, for example in the context of an expression such as "the process according to any of embodiments 1 to 4", each embodiment in this range is deemed to be explicitly disclosed to those skilled in the art, i.e. the meaning of this expression is to be understood by those skilled in the art as synonymous with "the process according to any of embodiments 1, 2, 3, and 4". It should be noted that the embodiments that follow constitute a suitably structured part of the description directed to general and preferred aspects of the present invention.

1. A composite material comprising
    i) a nonwoven layer comprising fibers formed from a first thermoplastic elastomer having meshes with a mesh size in the range from 10 to 100 μm;
    ii) a membrane layer comprising a second thermoplastic elastomer and having a layer thickness of less than 30 μm, wherein the membrane is either pore-free (ii.1) or is porous and has pores with an average pore diameter of less than 2000 nm, determined by means of Hg porosimetry in accordance with DIN 66133, (ii.2);
    wherein the membrane (ii) is at least partially in direct contact with the fibers of the nonwoven layer (i), and covers the mesh openings in the nonwoven layer (i) at least partially, and wherein the fibers of the first nonwoven layer (i) and the membrane (ii) in the contact area are at least partly joined to one another in an interlocking manner.
2. The composite material according to embodiment 1, wherein the membrane layer (ii) is obtained or obtainable by
    (1) providing a solution (L1) comprising at least one thermoplastic elastomer;
    (2) creating a membrane from the solution (L1) by means of phase inversion.
3. The composite material according to embodiment 2, where the solution (L1) further comprises at least one additive selected from the group consisting of polytetrahydrofuran (PTHF) and ammonium compound, wherein (2) comprises:
    (2.a) forming a film from the solution (L1);
    (2.b) heating the film obtained according to (2.a) to a temperature of ≥60° C., preferably in the range from 60 to 130° C., to obtain a porous film having pores with an average pore diameter of less than 2000 nm, determined by means of Hg porosimetry in accordance with DIN 66133,
    wherein the ammonium compound preferably comprises one or more ammonium compounds which decompose below the softening temperature of the TPU and leave behind pores without residue, more preferably one or more ammonium compounds selected from the group consisting of ammonium acetate [$NH_4(O-C(=O)-CH_3)$], diammonium carbonate [$(NH_4)_2CO_3$] and ammonium hydrogen carbonate (salt of hartshorn, $NH_4HCO_s$), more preferably at least ammonium acetate.
4. The composite material according to any of embodiments 1 to 3, wherein the first thermoplastic elastomer of the nonwoven layer (i) and the second thermoplastic elastomer of the membrane layer (ii) are independently selected from the group consisting of polyurethane, polyester, polyetherester, polyesterester, polyamide, polyetheramide, polybutadiene-styrene, and ethylene-vinyl acetate, the first thermoplastic elastomer and the second thermoplastic elastomer being selected such that they are mutually compatible, wherein the first thermoplastic elastomer and the second thermoplastic elastomer are preferably both a, respectively mutually compatible, thermoplastic polyurethane (TPU), where the TPU of the nonwoven layer (i) is identical to or different from, preferably identical to, the TPU of the membrane layer (ii).
5. The composite material according to any of embodiments 1 to 4, wherein the fibers of the nonwoven layer (i) have a diameter in the range from 0.01 to 100 μm, preferably in the range from 1 to 50 μm, more preferably in the range from 5 to 30 μm, more preferably in the range from 10 to 30 μm.
6. The composite material according to any of embodiments 1 to 5, wherein the nonwoven layer (i) has a mesh size in the range from 20 to 95 μm, preferably in the range from 30 to 90 μm, more preferably in the range from 40 to 80 μm.
7. The composite material according to any of embodiments 1 to 6, having a watertightness (LEP) of at least 0.5 bar, preferably at least 1 bar.
8. The composite material according to any of embodiments 1 to 7, having an elongation at break of more than 200%, preferably of more than 250%.
9. The composite material according to any of embodiments 1 to 8, having a water vapor permeability (WVP) at 38° C. and 90% humidity of at least 1000 g/m$^2$*d.
10. A process for producing a composite material, comprising:
    a) providing a nonwoven layer (i) comprising fibers formed from a first thermoplastic elastomer and having meshes with a mesh size in the range from 10 to 100 μm;
    b) providing a membrane layer (ii) comprising a second thermoplastic elastomer which is compatible with the first thermoplastic elastomer of the nonwoven layer (i);
    c) applying the membrane layer (ii) to the nonwoven layer (i) and joining (i) and (ii) in an interlocking manner by means of cold welding;
    to obtain a composite material.
11. The process for producing a composite material according to embodiment 10, wherein the first thermoplastic elastomer of the nonwoven layer (i) provided according to (a) and the second thermoplastic elastomer of the membrane layer (ii) provided according to (b) are independently selected from the group consisting of polyurethane, polyester, polyetherester, polyesterester, polyamide, polyetheramide, polybutadiene-styrene, and ethylenevinyl acetate, the first thermoplastic elastomer and the second thermoplastic elastomer being selected such that they are mutually compatible, wherein the first thermoplastic elastomer and the second thermoplastic elastomer are preferably both a, respectively mutually compatible, thermoplastic polyurethane (TPU), where the first TPU is identical to or different from, preferably identical to, the second TPU.

12. The process for producing a composite material according to embodiment 10 or 11, wherein the membrane layer (ii) has a layer thickness of less than 30 µm, wherein the membrane is either pore-free (ii.1) or is porous and has pores with an average pore diameter of less than 2000 nm, determined by means of Hg porosimetry in accordance with DIN 66133, (ii.2).

13. The process for producing a composite material according to any of embodiments 10 to 12, wherein (b) comprises:
    b.1) providing a polymer solution comprising the second thermoplastic elastomer, which is compatible with the first thermoplastic elastomer of the nonwoven layer (i);
    b.2) creating a membrane layer (ii) from the polymer solution provided according to (b.1) by means of phase inversion.

14. The process for producing a composite material according to any of embodiments 10 to 13, wherein the polymer solution provided according to (b) comprises an organic solvent having a $\log_{KOW}$ in the range from −1.5 to +1, preferably selected from the group of dimethylformamide (DMF, $\log_{KOW}$−0.85), tetrahydrofuran (THF, $\log_{KOW}$ 0.46), dimethyl sulfoxide (DMSO, $\log_{KOW}$−1.35), N-methyl-2-pyrrolidone (NMP, $\log_{KOW}$−0.46), ethyl ester of acetic acid (ethyl acetate, $\log_{KOW}$ 0.73), methyl ethyl ketone (MEK, $\log_{KOW}$ 0.29), ethyl ethyl ketone (EEK, $\log_{KOW}$ 0.99) and mixtures of two or more of these organic solvents, more preferably selected from the group of DMF, THF, and mixtures of DMF and THF.

15. The process for producing a composite material according to any of embodiments 10 to 14, wherein the polymer solution provided according to (b) has a polymer concentration in the range from 3-50% by weight, preferably in the range from 5-30% by weight, more preferably in the range from 10-20% by weight, in particular when the second thermoplastic elastomer is a TPU, based in each case on the total weight of the polymer solution of 100% by weight.

16. The process for producing a composite material according to any of embodiments 10 to 15, wherein the polymer solution further comprises at least one additive selected from the group consisting of polytetrahydrofuran and an ammonium compound, and optionally water, wherein (b.2) according to embodiment 12 comprises:
    (b.2.a) forming a film from the polymer solution;
    (b.2.b) heating the film obtained according to (b.2.a) to a temperature of ≥60° C., preferably to a temperature in the range from ≥60° C. to 130° C., to obtain a porous membrane layer (ii.2) having pores with an average pore diameter of less than 2000 nm, determined by means of Hg porosimetry in accordance with DIN 66133.

17. The process for producing a composite material according to embodiment 16, wherein the polymer solution comprises the at least one further additive in a weight-based mixing ratio of second thermoplastic elastomer: additive of 1:10 to 10:1, preferably 1:5 to 5:1.

18. The process for producing a composite material according to any of embodiments 10 to 17, wherein the fibers of the nonwoven layer (i) provided according to (a) have a diameter in the range from 0.01 to 100 µm, preferably in the range from 1 to 50 µm, more preferably in the range from 5 to 30 µm, more preferably in the range from 10 to 30 µm.

19. The process for producing a composite material according to any of embodiments 10 to 18, wherein the nonwoven layer (i) provided according to (a) has a mesh size in the range from 20 to 95 µm, preferably in the range from 30 to 90 µm, more preferably in the range from 40 to 80 µm.

20. A composite material obtained or obtainable by the process according to any of embodiments 10 to 19.

21. The use of a composite material according to any of embodiments 1 to 10 or of a nonwoven composite material obtained or obtainable by the process according to any of embodiments 11 to 19 for the production of a functional article, the functional article preferably being selected from the group consisting of an item of functional clothing, in particular jacket, trousers, sweater, vest, hooded shirt, overalls, cape, poncho, coat, cap or hat, preferably for sportswear such as golf, ski, hiking, running, and jogging wear, functional shoe, a functional item, in particular bag, rucksack or tent; an item of swimwear, in particular swimsuit, tankini, bikini, swimming trunks, bathing shoe or bathing cap; clothing for water sports, in particular sailing wear, surf wear or kitesurf wear, preferably surf wear or kitesurf wear, preferably an item of functional clothing.

The invention is explained in more detail below with the aid of examples, without being restricted thereto.

EXAMPLES

1. Chemicals

TABLE 1

Chemicals used

| Abbreviation | Name | Chemical composition |
|---|---|---|
| Iso1 | Isocyanate 1 | 4,4'-diisocyanatodiphenylmethane |
| Poly1 | Polyol 1 | polytetrahydrofuran, $Mn^{1)}$: ~2000 g/mol, with an OH number of 56 (PTHF2000); melting point 36° C. |
| Poly2 | Polyol 2 | polytetrahydrofuran, $Mn^{1)}$: ~1000 g/mol, with an OH number of 112 (PTHF1000); melting point in the range from 23 to 28° C. |
| Poly3 | Polyol 3 | polyethylene glycol, $Mn^{1)}$: ~1500 g/mol with an OH number of 75 |
| Poly4 | Polyol 4 | polyester diol based on adipic acid and butane-1,4-diol, $Mn^{1)}$ ~2440 g/mol |
| CE1 | Chain extender 1 | butane-1,4-diol |
| CE2 | Chain extender 2 | propane-1,3-diol |
| Plast1 | Plasticizer 1 | acetyl tributyl citrate |
| Stab1 | Stabilizer 1 (antioxidant) | sterically hindered phenol |
| Stab2 | Stabilizer 2 (hydrolysis stabilizer) | polymeric carbodiimide |
| UV1 | UV stabilizer | benzotriazole derivatives |
| Wax1 | Lubricant 1 | bisstearylamide |
| Wax2 | Lubricant 2 | ester wax |

[1] Mn is the number-average molecular weight

2. Measurement Methods
   Hardness: DIN ISO 7619-1 (February 2012)
   Tensile strength, elongation at break and stress: DIN 53504 (March 2017)
   Stress value: DIN 53504-S2 (March 2017)
   Tear propagation resistance: DIN ISO 34-1, B (b) (September 2016)
   Density: DIN EN ISO 1183-1 A (April 2013)
   Film thickness: determined by means of a micrometer screw gauge or scanning electron microscopy (SEM), preferably by means of SEM
   Water vapor permeability (WVP): DIN 53122-1 (August 2001) at 38° C. and 90% humidity and at 23° C. and 85% humidity
   The water vapor permeabilities (WVP) were determined using a cup method at 38° C. and 90% relative humidity and at 23° C. and 85% relative humidity in accordance with DIN 53122-1 (August 2001). Absolute WVP values were determined for a specific membrane thickness. High WVP values were desirable and permitted high water vapor flow rates.
   Watertightness (LEP): DIN EN 20811 (August 1992)
   The liquid entry pressure (LEP) of the membranes was determined in accordance with DIN EN 20811—(August 1992) using a pressure cell having a diameter of 60 mm with ultrapure water (salt-free water, filtered through a Millipore UF system) up to 4.0 bar (40 000 mm water column). The liquid entry pressure LEP is defined as the pressure at which the liquid water starts to permeate through the membrane. A high LEP allows the membrane to withstand a high water column (liquid).
   Pore diameter: Hg porosimetry in accordance with DIN 66133 (June 1993)

3. General Procedure for the Preparation of the Thermoplastic Polyurethanes (TPUs)
   The chain extender was added to the polyols with stirring. After subsequently heating the solution to 80° C., the isocyanate and optionally the additives listed in the recipes were added and the mixture was stirred until the solution was homogeneous. The reaction mixture heated up and was then poured out onto a heated, Teflon-coated table. The cast slab was heat-treated at 80° C. for 15 hours. The material thus produced was comminuted in a mill to give pourable pellets, dried again and filled into aluminum-coated PE bags for further use.

Extrusion:
To homogenize the samples produced, these were processed into cylindrical granules in a twin-screw extruder.
Extrusion was carried out in a twin-screw extruder having a 19 mm screw diameter, affording an extrudate diameter of approx. 2 mm.

TABLE 2

| Extrusion data | |
|---|---|
| Extruder: | Corotating APV MP19 twin-screw extruder |
| Temperature profile: | HZ1 170° C. to 220° C. |
| | HZ2 180° C. to 230° C. |
| | HZ3 190° C. to 230° C. |
| | HZ4 210° C. to 240° C. |
| | HZ5 (die) 200° C. to 240° C. |
| Screw speed: | 100 rpm |
| Pressure: | approx. 10 to 30 bar |
| Extrudate cooling: | water bath (10° C.) |

The temperature profile was selected depending on the softening temperature of the polymer.

4. Preparation of Thermoplastic Polyurethanes
   The thermoplastic polyurethanes TPU 1 to 7 visible in table 1 were prepared from the starting materials in accordance with the general procedure given in 3.

TABLE 3

Composition of TPUs 1 to 7

| | TPU 1 (% by wt.) | TPU 2 (% by wt.) | TPU3 (% by wt.) | TPU 4 (% by wt.) | TPU 5 (% by wt.) | TPU6 (% by wt.) | TPU7 (% by wt.) |
|---|---|---|---|---|---|---|---|
| Poly1 | 34.24 | | | | | | |
| Poly2 | 34.24 | | 55.61 | | 61.22 | 48.56 | |
| Poly3 | | 51.96 | | 45.57 | | | |
| Poly4 | | | | | | | 57.75 |
| Iso1 | 25.47 | 37.41 | 35.04 | 41.92 | 31.84 | 40.30 | 32.16 |
| CE1 | 4.52 | 9.09 | 7.60 | 12.06 | 5.94 | 10.14 | 9.22 |
| CE2 | | 1.10 | | | | | |
| Stab1 | 1.00 | 0.30 | 1.00 | 0.30 | 1.00 | 1.00 | |
| Stab2 | | | | | | | |
| UV1 | 0.50 | | 0.35 | | | | |
| Wax1 | | | 0.05 | | | 0.05 | 0.04 |
| Wax2 | | 0.15 | | 0.15 | | | |

5. Determination of the Mechanical Properties of the TPUs
   The mechanical properties of the TPUs prepared, measured on injection-molded plates made from the TPUs prepared according to section 4, can be found in table 4.

TABLE 4 mechanical properties of the TPUs prepared

| TPU | | TPU1 | TPU2 | TPU3 | TPU4 | TPU5 | TPU6 | TPU7 |
|---|---|---|---|---|---|---|---|---|
| Density | [g/cm$^3$] | 1.08 | 1.21 | 1.12 | 1.22 | 1.11 | 1.15 | 1.21 |
| Hardness | [Shore A] | 72 | 85 | 87 | 90 | 80 | 96 | 91 |
| Abrasion | [mm$^3$] | 33 | 67 | 34 | 69 | 68 | 28 | 37 |
| Tensile strength | [MPa] | 36 | 35 | 46 | 44 | 46 | 54 | 51 |
| Elongation at break | [%] | 700 | 890 | 600 | 690 | 800 | 530 | 590 |
| Tear propagation resistance | [N/mm] | 45 | 46 | 75 | 65 | 63 | 102 | 99 |

6. Production of the Carrier Nonwovens (Nonwoven Layer (i))
   On a meltblown pilot plant, spun nonwovens having a basis weight of 50 and 90 g/m$^3$ were produced from TPU3 and TPU6. To this end, the respective TPU was melted in a twin-screw extruder, conveyed continuously into the spinning head by means of a melt pump, and laid on a conveyor belt running underneath which was covered with a release nonwoven made of polypropylene. The release nonwoven only had the function of a separator, in order to prevent the TPU nonwoven from sticking to the underlayer and to ensure that the TPU nonwovens produced could be rolled up and unrolled easily. The TPU fibers within the nonwoven produced were firmly welded to one another and could not be separated from one another.

TABLE 5

TPU nonwovens

| Nonwoven [nonwoven layer (i)] | | Nonwoven 1 TPU3 | Nonwoven 2 TPU3 | Nonwoven 3 TPU6 | Nonwoven 4 TPU6 | Nonwoven 5 TPU7 |
|---|---|---|---|---|---|---|
| Basis weight | [g/m³] | 50 | 90 | 50 | 90 | 100 |
| Average fiber thickness | [µm] | 20 | 20 | 20 | 25 | 25 |
| Elongation at break | [%] | 420 | 480 | 280 | 360 | 310 |
| Mesh size (estimated mean from scanning electron microscopy (SEM) image) | [µm] | 80 | 40 | 80 | 40 | 40 |

7. Production of the Ultrathin Membranes/Production of the Composite Materials 7.1 Preparation of Polymer Solutions from TPU1, TPU2, TPU4, TPU5

A 10-20% by weight solution in THF (tetrahydrofuran) was prepared from each of the TPUs 1, 2, 4, 5. To this end, 100 g or 200 g of the respective TPU and 800 ml of THF were added to a 1500 ml roller bottle. The roller bottle was moved continuously for 10 h on a roller system until all of the TPU had dissolved. The TPU solution was then drawn through a 20 µm filter and packed into a wide-neck bottle with a THF-tight lid.

7.2 Production of the Ultrathin Membranes

The polymer solutions obtained from 7.1 were processed into thin TPU films using a doctor blade in a laboratory film-drawing system, these films then being transferred to the carrier nonwovens. In order to further improve the water vapor permeability, ammonium acetate solution ($NH_4ac$) was added to the TPU solutions in some cases in a TPU:$H_2O$:ammonium acetate mixing ratio=1:1:1 and the mixture was mixed intensively. In another case (film 8), PTHF000 was used as pure substance in the solution in a TPU:PTHF1000 ratio=3:1. Ater being transferred to the carrier nonwovens, the ammonium acetate-comprising films were stored for 4 hours at 100° C. in order to decompose the ammonium acetate and hence in turn to increase the porosity and the water vapor permeability. Film 8 was stored at a temperature of 60° C. for 10 hours. The TPUs and concentrations used can be seen in table 6 below.

TABLE 6

TPUs and concentrations used

| Ultrathin film | | Film1 | Film2 | Film3 | Film4 | Film5 |
|---|---|---|---|---|---|---|
| TPU | | TPU1 | TPU2 | TPU2 | TPU2 | TPU2 |
| Concentration of TPU in THF solution | % by wt. | 10 | 10 | 20 | 20 | 10 |
| Addition of poly 1 (PTHF1000) to the TPU/THF solution | % by wt. | | | | | |
| Addition of $NH_4ac$ to the TPU/THF solution | % by wt. | | | | 20 | 10 |
| Addition of $H_2O$ to the TPU/THF solution | % by wt. | | | | 20 | 10 |
| Film thickness | [µm] | 18 | 20 | 25 | 25 | 20 |

TABLE 6-continued

TPUs and concentrations used

| Ultrathin film | | Film6 | Film7 | Film8 | Film9 | Film10 |
|---|---|---|---|---|---|---|
| TPU | | TPU1 | TPU4 | TPU5 | TPU5 | TPU5 |
| Concentration of TPU in THF solution | % by wt. | 10 | 10 | 10 | 20 | 10 |
| Addition of poly 1 (PTHF1000) to the TPU/THF solution | % by wt. | | | 3.3 | | |
| Addition of $NH_4ac$ to the TPU/THF solution | % by wt. | 10 | | | 20 | 10 |
| Addition of $H_2O$ to the TPU/THF solution | % by wt. | 10 | | | 20 | 10 |
| Film thickness | [µm] | 20 | 10 | 10 | 25 | 20 |

7.3 Production of Composite Material from Ultrathin Film/Membrane and Carrier Nonwoven The ultrathin films were transferred to the carrier nonwovens in a state in which they still comprised a sufficient amount of solvent or adhesion in order to be cold welded to the carrier nonwoven and to form an interlocking join. A mechanical separation of nonwoven and (membrane) film after a short period of storage of the composite material was no longer possible without destroying it. Microscopic images showed that the fiber structure of the nonwoven is retained during the transfer and the mesh windows of the carrier nonwoven are closed by the (membrane) film.

The properties of the composite materials produced in accordance with the invention on the basis of the DIN standards can be found in table 7:

TABLE 7

| Properties of the composite materials | | | | | |
|---|---|---|---|---|---|
| Ultrathin film | | Film1 | Film6 | Film6 | Film6 |
| Carrier nonwoven | | Nonwoven 1 | Nonwoven 1 | Nonwoven 1 | Nonwoven 2 |
| Heat treatment | 100° C./4 h | | | x | x |
| Watertightness (LEP) | [bar] | >1 | 0.5 | 0.5 | 0.5 |
| Water vapor permeability (WVP) 38° C./90% rel. humidity | [g/m²*d] | 1590 | 2440 | 3080 | 2950 |
| Water vapor permeability (WVP) 23° C./90% rel. humidity | [g/m²*d] | 540 | 975 | 1470 | 1370 |
| Elongation at break | [%] | >400 | >400 | >400 | <400 |
| Ultrathin film | | Film2 | Film4 | Film4 | Film7 | Film1 |
| Carrier nonwoven | | Nonwoven 2 | Nonwoven 2 | Nonwoven 2 | Nonwoven 5 | Nonwoven 5 |
| Heat treatment | 100° C./4h | | | x | | |
| Watertightness (LEP) | [bar] | 1 | 0.5 | 0.5 | >0.5 | >1 |
| Water vapor permeability (WVP) 38° C./90% rel. humidity | [g/m²*d] | 2240 | 2490 | 2605 | 1560 | 1470 |
| Water vapor permeability (WVP) 23° C./90% rel. humidity | [g/m²*d] | 905 | 1050 | 1010 | 500 | 510 |
| Elongation at break | [%] | >450 | >400 | >450 | >250 | >250 |

As can be seen from the measured values, all composite materials displayed sufficient elongation at break (preferably >200%). The water vapor permeability (WVP) at 3800 and 90% humidity was at least 1000 g/m²*d for all composite materials, determined in accordance with DIN 53122-1 (August 2001). The watertightness (LEP) was in each case at least 0.5 bar, determined in accordance with DIN EN 20811 (August 1992).

It can be seen that the composite material has a good watertightness of at least 0.5 bar, and yet, as a result of the thinness of the membrane layer of less than 30 μm, is capable of adequately transporting moisture through absorption/resorption. It could in particular be noted that the composite materials comprising pores (see composite materials based on films 4 and 6), as a result of the addition of additives during the production of the films and the later removal of these additives, have particularly good values for water vapor permeability, while the watertightness remained sufficiently high in spite of this.

CITED LITERATURE

EP 2 077 733 B1
US 2010/0028553 A1
WO 2012/111930 A2
KR 2017120821 A
KR 2017120807 A
KR 2017120818 A
EP 19168078.4 (unpublished, filing date Apr. 9, 2019)
WO 2019/072754 A1
"Kunststoffhandbuch [Plastics Handbook], 7, Polyurethane [Polyurethanes]", Carl Hamer Verlag, 3rd edition 1993, section 3.1
"Kunststoffhandbuch"; 7, "Polyurethane", Carl Hanser Verlag, 1st edition 1966, pages 103-11

The invention claimed is:

1. A process for producing a composite material, comprising:
providing a nonwoven layer (i) comprising fibers formed from a first thermoplastic polyurethane and having meshes with a mesh size in the range from 10 to 100 μm, determined by scanning electron microscopy;
b) providing a membrane layer (ii) comprising a second thermoplastic polyurethane which is compatible with the first thermoplastic polyurethane of the nonwoven layer (i), wherein the membrane layer is porous and has pores with an average pore diameter of less than 2000 nm, determined by Hg porosimetry in accordance with DIN 66133;
c) applying the membrane layer (ii) to the nonwoven layer (i) and joining (i) and (ii) in an interlocking manner by cold welding;
to obtain a composite material;
wherein
cold welding according to (c) means that the fibers of the nonwoven layer (i) and the membrane (ii) in the contact area at least partly form an interlocking joint with one another, wherein on account of the presence of solvent firstly the nonwoven layer (i) and/or the membrane layer (ii) partly dissolve, and then the membrane layer (ii) hardens on the nonwoven layer (i) when the solvent is removed,
wherein (b) comprises:
b 1) providing a polymer solution comprising the second thermoplastic polyurethane, wherein the polymer solution further comprises at least one additive selected from the group consisting of polytetrahydrofuran and an ammonium compound, and wherein the polymer solution comprises the at least one additive in a weight-based mixing ratio of second thermoplastic polyurethane: additive of 1:10 to 10:1, and
b 2) creating a membrane layer (ii) from the polymer solution provided according to (b 1) by phase inversion.

2. The process for producing a composite material according to claim 1, wherein the first TPU is identical to or different from the second TPU.

3. The process for producing a composite material according to claim 1, wherein the membrane layer (ii) has a layer thickness of less than 30 μm, determined by scanning electron microscopy.

4. The process for producing a composite material according to claim 1, wherein the polymer solution further comprises optionally water,
wherein (b 2) comprises:
(b 2 a) forming a film from the polymer solution;
(b 2 b) heating the film obtained according to (b 2 a) to a temperature of >60° C., to obtain the porous membrane layer having pores with an average pore diameter of less than 2000 nm, determined by Hg porosimetry in accordance with DIN 66133.

5. The process for producing a composite material according to claim 1, wherein the fibers of the nonwoven layer (i) provided according to (a) have a diameter in the range from 0.01 to 100 μm, determined by scanning electron microscopy;
and/or
wherein the nonwoven layer (i) provided according to (a) has a mesh size in the range from 20 to 95 μm, determined by scanning electron microscopy.

6. The process for producing a composite material according to claim 4, wherein in (b 2 b), the film obtained according to (b 2 a) is heated to a temperature in a range from >60° C. to 130° C.

7. The process for producing a composite material according to claim 4, wherein the polymer solution comprises the at least one additive in the weight-based mixing ratio of second thermoplastic polyurethane:additive of 1:5 to 5:1.

8. The process for producing a composite material according to claim 5, wherein the fibers of the nonwoven layer (i) provided according to (a) have a diameter in a range from 10 to 30 μm, determined by scanning electron microscopy.

9. The process for producing a composite material according to claim 5, wherein the nonwoven layer (i) provided according to (a) has a mesh size in a range from 40 to 80 μm, determined by scanning electron microscopy.

10. The process for producing a composite material according to claim 1, wherein the at least one additive is polytetrahydrofuran.

11. The process for producing a composite material according to claim 1, wherein the at least one additive is an ammonium compound.

12. The process for producing a composite material according to claim 1, wherein the first TPU is identical to the second TPU.

13. The process for producing a composite material according to claim 1, wherein the first TPU is different from the second TPU.

14. The process for producing a composite material according to claim 1, wherein the polymer solution further comprises water.

* * * * *